US010804984B1

(12) United States Patent
Cheraghi et al.

(10) Patent No.: US 10,804,984 B1
(45) Date of Patent: Oct. 13, 2020

(54) ADAPTIVE HYBRID PRECODER SELECTION IN 2D ANTENNA CONFIGURATION

(71) Applicant: QUALCOMM Incorporated, San Diego, CA (US)

(72) Inventors: Parisa Cheraghi, San Diego, CA (US); Ahmed Elshafie, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/432,299

(22) Filed: Jun. 5, 2019

(51) Int. Cl.
*H04B 7/0456* (2017.01)
*H04B 7/06* (2006.01)
*H04L 25/02* (2006.01)

(52) U.S. Cl.
CPC ......... *H04B 7/0456* (2013.01); *H04B 7/0626* (2013.01); *H04L 25/0202* (2013.01)

(58) Field of Classification Search
CPC .................................................. H04B 7/0456

USPC .......................................................... 370/328
See application file for complete search history.

(56) References Cited

U.S. PATENT DOCUMENTS

2015/0223161 A1* 8/2015 Xiao .................... H04B 7/0417
370/329
2016/0337105 A1* 11/2016 Lawton ................. H04L 1/0026

* cited by examiner

*Primary Examiner* — Peter G Solinsky
(74) *Attorney, Agent, or Firm* — Qualcomm Incorporated

(57) ABSTRACT

Apparatus, methods, and computer-readable media for adaptive hybrid precoder selection in 2D antenna configurations are disclosed herein. An example method of wireless communication at a UE includes estimating a channel based on CSI-RS received on each port of a plurality of CSI-RS ports from a base station. The example method includes determining, based on the channel estimation, whether to perform disjoint PMI processing or joint PMI processing when determining a first component of a PMI. The example, method includes determining the first component of the PMI based on the determined disjoint PMI processing or joint PMI processing.

30 Claims, 8 Drawing Sheets

ADAPTIVE HYBRID PRECODER SELECTION IN 2D ANTENNA CONFIGURATION

BACKGROUND

Technical Field

The present disclosure relates generally to communication systems, and more particularly, to precoder selection procedures.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A channel state feedback procedure may include a first device (e.g., a user equipment (UE)) receiving a channel state information reference signal (CSI-RS) from a second device (e.g., a base station) and transmitting a CSI report to the second device including, for example, channel conditions for the reference signals received at the first device. In some examples, determining the CSI report may include selecting a precoding matrix indicator (PMI). In some examples, a majority of the CSI report determination process may be utilized by the PMI selection. However, accurate PMI selection is beneficial, especially as the quantity of antennas in a system increases. PMI selection may include selecting a wideband component $W_1$ and a subband component $W_2$.

The present disclosure is directed to providing an improved approach for selecting PMI in a 2D antenna configuration. For example, techniques disclosed herein provide a hybrid disjoint-joint PMI processing approach for 2D antenna configurations. In some examples, the hybrid approach may be configured to determine when to utilize joint PMI processing or disjoint PMI processing based on channel conditions. By dynamically determining whether to utilize joint or disjoint PMI processing, the techniques disclosed herein may lead to significant CSI complexity reduction without introducing performance loss.

In an aspect of the disclosure, a method, a computer-readable medium, and an apparatus are provided. The apparatus may estimate a channel based on channel state information reference signals (CSI-RS) received on each port of a plurality of CSI-RS ports from a base station. The apparatus may determine, based on the channel estimation, whether to perform disjoint precoding matrix indicator (PMI) processing or joint PMI processing when determining a first component of a PMI. The apparatus may determine the first component of the PMI based on the determined disjoint PMI processing or joint PMI processing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
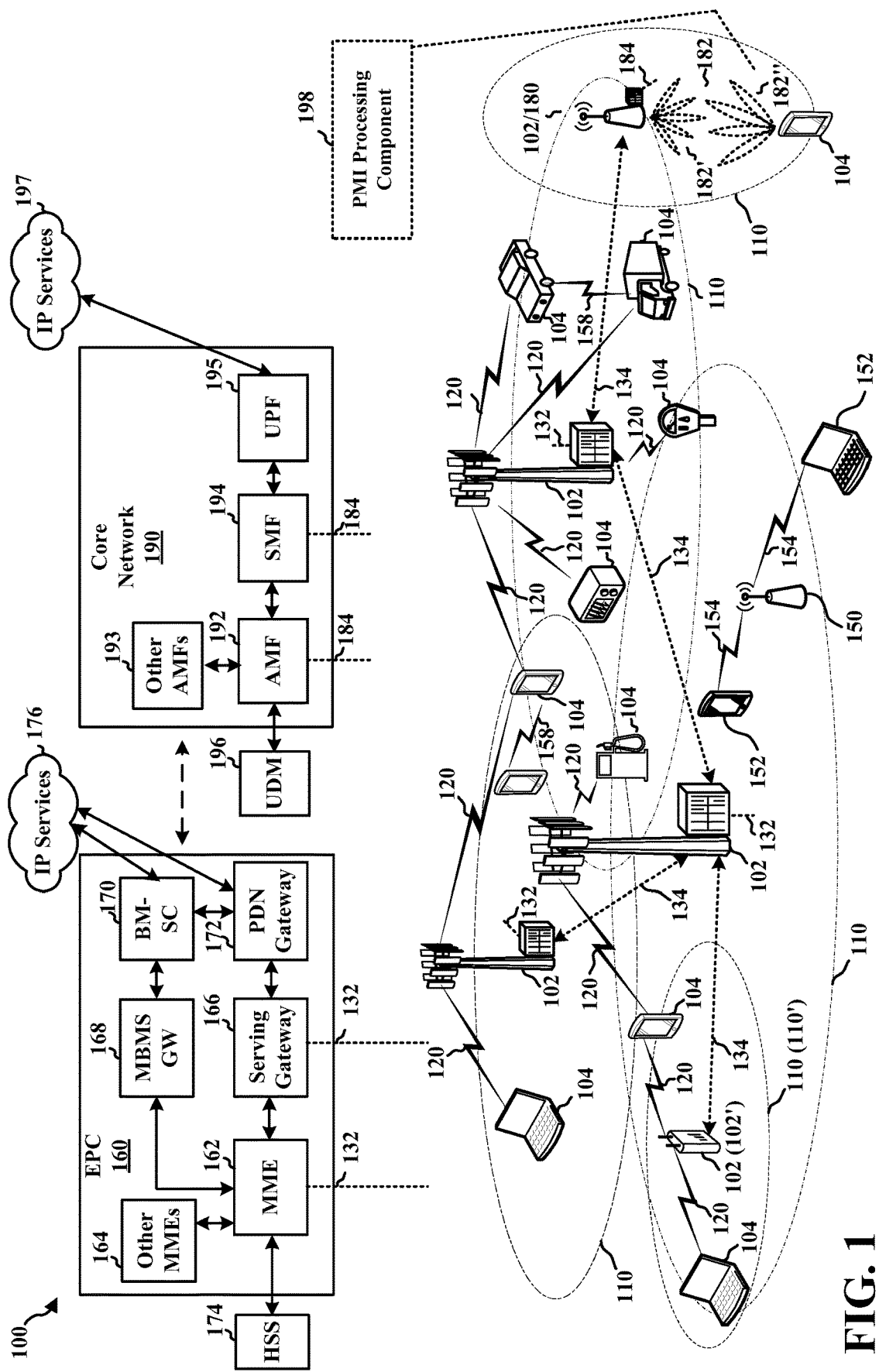
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via adaptive precoder selection in 2D antenna configurations. For example, in FIG. 1, the UE 104 may include a PMI processing component 198 configured to determine whether to perform disjoint PMI processing or joint PMI processing when determining a first component of the PMI. The PMI processing component 198 may be configured to determine whether to perform disjoint PMI processing or joint PMI processing based channel conditions, such as a channel estimation. In some examples, the PMI processing component 198 may determine to perform joint PMI processing or disjoint PMI processing based on long-term properties of the channel or may be based on a correlation between vertical and horizontal polarization components of the CSI-RS.

Figure 2:
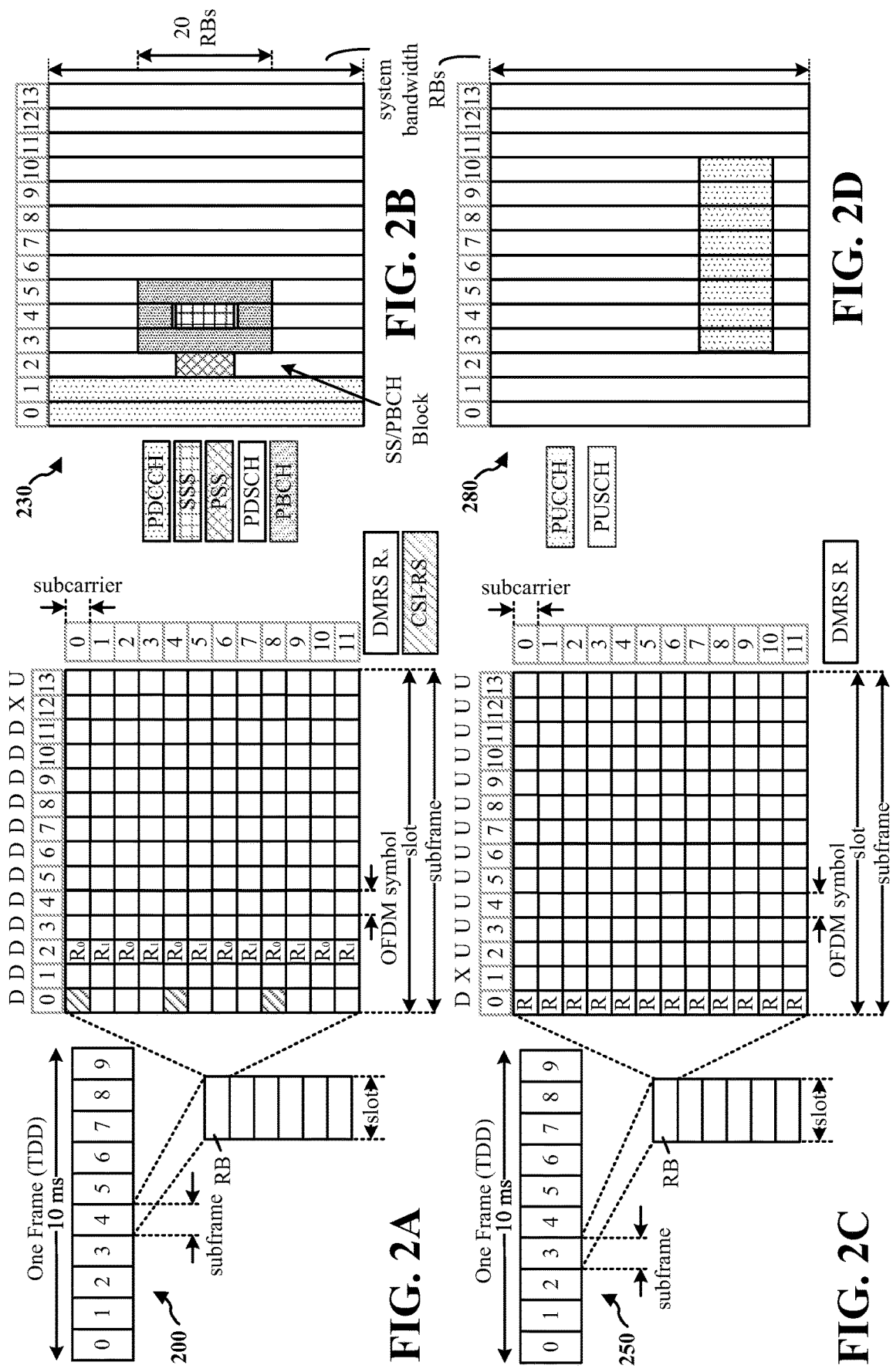
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

Although the following description may provide examples based on NR channel state feedback, it should be appreciated that the concepts described herein may be applicable to other communication technologies. For example, the concepts described herein may be applicable to LTE, LTE-A, CDMA, GSM, and/or other wireless technologies (or RATs) in which one or more reference signals and/or reports may be exchanged FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
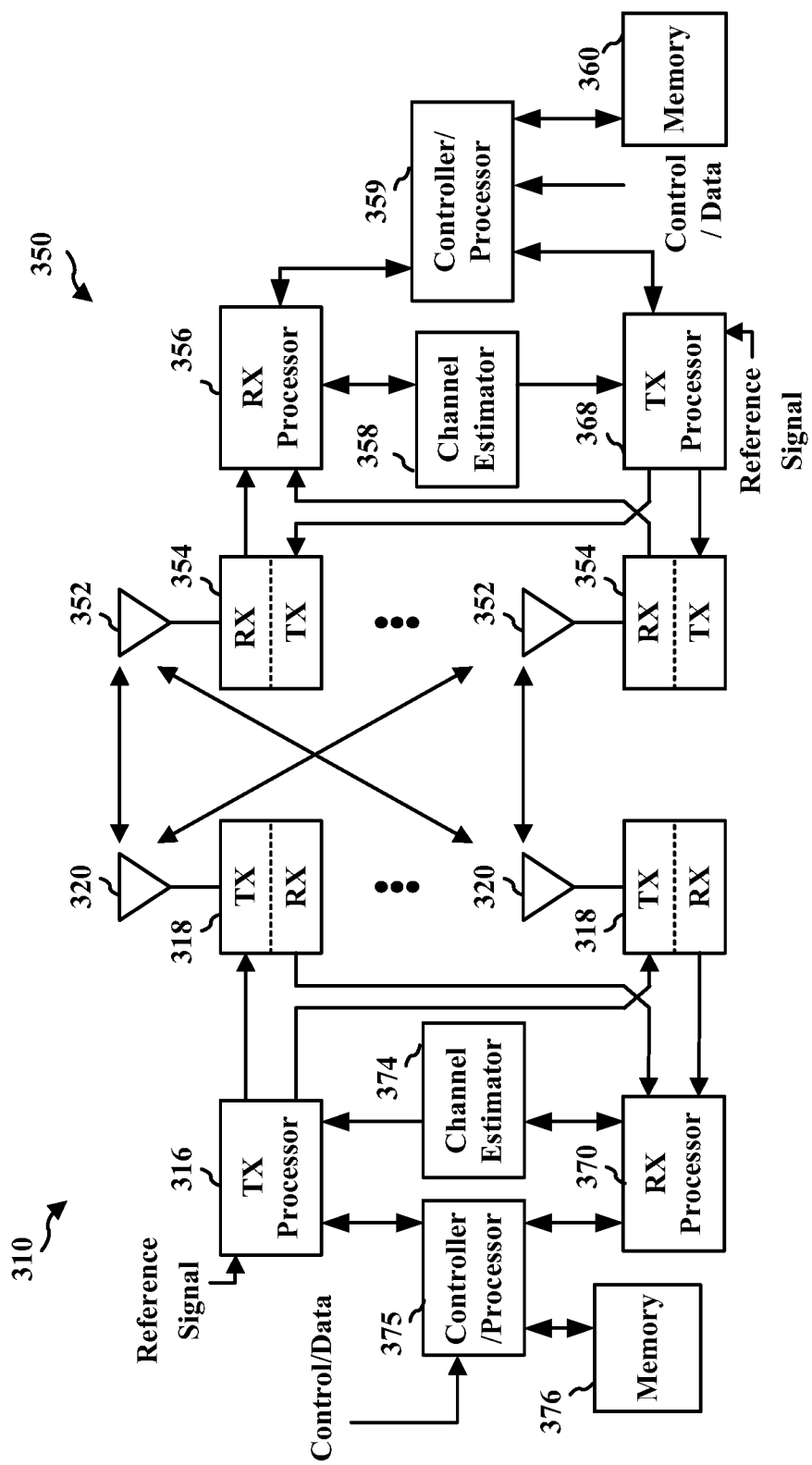
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 8:
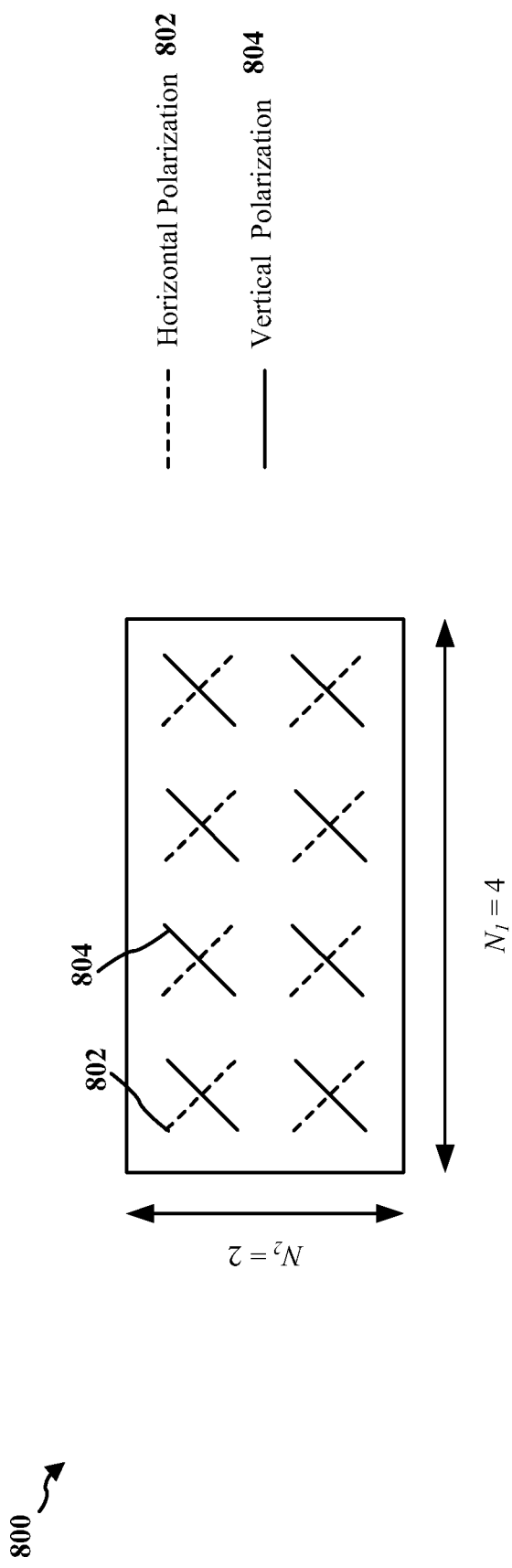
FIG. 8 is a diagram illustrating an example of a 2D antenna array.

In an effort to realize "Massive MIMO", a large number of ports have been introduced for a high number of antennas at NB. The increase in ports may allow for better beamforming along each of the horizontal (e.g., 802) and vertical polarization ports (e.g., 804), as well as interference mitigation which may lead to a higher throughput. A 2 dimensional (2D) antenna/port configuration, as shown in diagram 800 of FIG. 8, for example, has also been introduced which support the higher number of ports in order to have an enhanced wave control mechanism for 3D beamforming. In previous antennas, all the ports were configured in a single row arrangement (e.g., 1 dimensional). The 2D antennas may provide improved coverage, such as in-building coverage, and may be deployed in urban areas where height dependent beamforming may be beneficial. The 2D antennas may also accommodate a large number of antennas without increasing the deployment space.

A challenge with having a high number of antenna ports is determining the precoding matrix indicator (PMI), which may also be known as the "precoder". The increase of antenna ports may increase the complexity of the channel state information (CSI). The main complexity of the CSI may be driven by determining the PMI. In some examples, up to 75% of the overall CSI complexity may be attributed to the PMI selection. Accurate PMI selection may be crucial for throughput. For example, selection of an incorrect precoder may result in a substantial reduction of throughput.

A UE may conduct various radio channel condition measurements and report the results of the measurements to a base station, such as but not limited to performing channel state feedback procedures. For example, the UE may generate a CSI report in response to receiving the CSI-RS. The CSI report may include one or more components, such as channel quality information (CQI), a layer indicator (LI), a rank indicator (RI), and a PMI.

In some examples, the PMI may be selected from a codebook (or dictionary). In some examples, the codebook may be predetermined, for example, as provided by a standard. In NR, a dual stage codebook may be used for determining the precoder. For example, a UE may use Equation 1 (below) to determine a precoder.

$$W = W_1 W_2 \quad \text{(Equation 1)}$$

In Equation 1, W represents the precoder, $W_1$ represent a wideband component, and $W_2$ represents a subband component. The wideband component $W_1$ represents the wideband or long-term properties of the channel. The subband component $W_2$ represents the subband or short-term properties of the channel. For example, the subband component $W_2$ may be useful for determining beam selection and/or co-phasing of polarization. In some examples, the subband component $W_2$ may correspond to a portion of a frequency band, while the wideband component $W_1$ may correspond to the frequency band. The precoder of Equation 1 may represent a single stage codebook for up to 2 CSI-RS ports.

The precoding matrix for Type I may be represented using Equation 2 (below)

$$W = \frac{1}{\sqrt{2vN_1 N_2}} \begin{bmatrix} w_{0,0} & w_{0,1} & \cdots & w_{0,v-1} \\ w_{1,0} & w_{1,1} & \cdots & w_{1,v-1} \end{bmatrix} \quad \text{(Equation 2)}$$

In Equation 2, v represents the layers, $N_1$ represents the number of CSI-RS ports in the horizontal dimension, and $N_2$ represents the number CSI-RS ports in the vertical dimension.

In some examples, the wideband component $W_1$ may be represented using Equation 3 (below)

$$W_1 = \begin{bmatrix} B & 0 \\ 0 & B \end{bmatrix} \quad \text{(Equation 3)}$$

In Equation 3, the wideband component $W_1$ may be represented via a block diagonal matrix in which B represents a set of vectors corresponding to oversampled 2D DFT beams. The columns of B may be a subset of DFT vector sets, which may be represented using Equation 4 (below)

$$B = [b_{m,l}, \ldots, b_{m+L-1, l+L-1}] \quad \text{(Equation 4)}$$

In Equation 4, $b_{m,l}$ may represent the 2D DFT vector having a length $N_1 N_2$. The $b_{m,l}$ (or the 2D DFT vector) may be represented using Equation 5 (below)

$$b_{m,l} = v_m \otimes u_l \quad \text{(Equation 5)}$$

In Equation 5, $v_m$ represents the 1D DFT vector in the horizontal dimension, and $u_l$ represents the 1D DFT vector in the vertical dimension. The $v_m$ and $u_l$ may be represented using Equations 6 and 7 (below)

$$v_m = \left[1, e^{\frac{j2\pi m}{O_1 N_1}}, \ldots, e^{\frac{j2\pi m(N_1 - 1)}{O_1 N_1}}\right]^T \quad \text{(Equation 6)}$$

$$u_l = \left[1, e^{\frac{j2\pi l}{O_2 N_2}}, \ldots, e^{\frac{j2\pi l(N_2 - 1)}{O_2 N_2}}\right]^T \quad \text{(Equation 7)}$$

The optimal manner to determine the final 2D precoder may be joint PMI processing, where the optimal 1D DFT beam for both the horizontal and vertical are determined jointly. However, another manner to determine the final 2D precoder may be utilizing disjoint PMI processing, where the 1D DFT beams in the horizontal and vertical dimension are determined independent of each other. For example, one can select the $v_m$ independently of the $u_l$ and based on the best 1D DFT of each beam, select the final 2D DFT vector $b_{m,l}$ as the precoder. Disjoint PMI processing of each dimension may lead to sub-optimal precoder selection, which may lead to throughput degradation. However, disjoint PMI processing may lead to a significant reduction of complexity in determining the PMI. For example, disjoint processing may lead to a complexity reduction by a factor of 5-6 as compared to conventional joint PMI processing. Although joint PMI processing may result in the best or optimal $b_{m,l}$ and may perform well with all channel/correlation types, joint PMI processing has a high complexity.

The present disclosure relates to improving the manner in which a precoder may be determined in a 2D antenna configuration. The present disclosure provides a hybrid disjoint-joint PMI processing determination approach that may be utilized in 2D antenna configurations. The hybrid approach, of the present disclosure, may allow for optimal performance in determining the precoder while reducing the CSI complexity. The hybrid approach may be configured to determine when the channel may be experiencing high antenna correlation, and fall back to joint PMI processing. High channel correlation may lead to a reduction of performance for disjoint PMI processing, such that the approach may fall back to joint PMI processing and does not lead to a degradation of performance.

Figure 4:
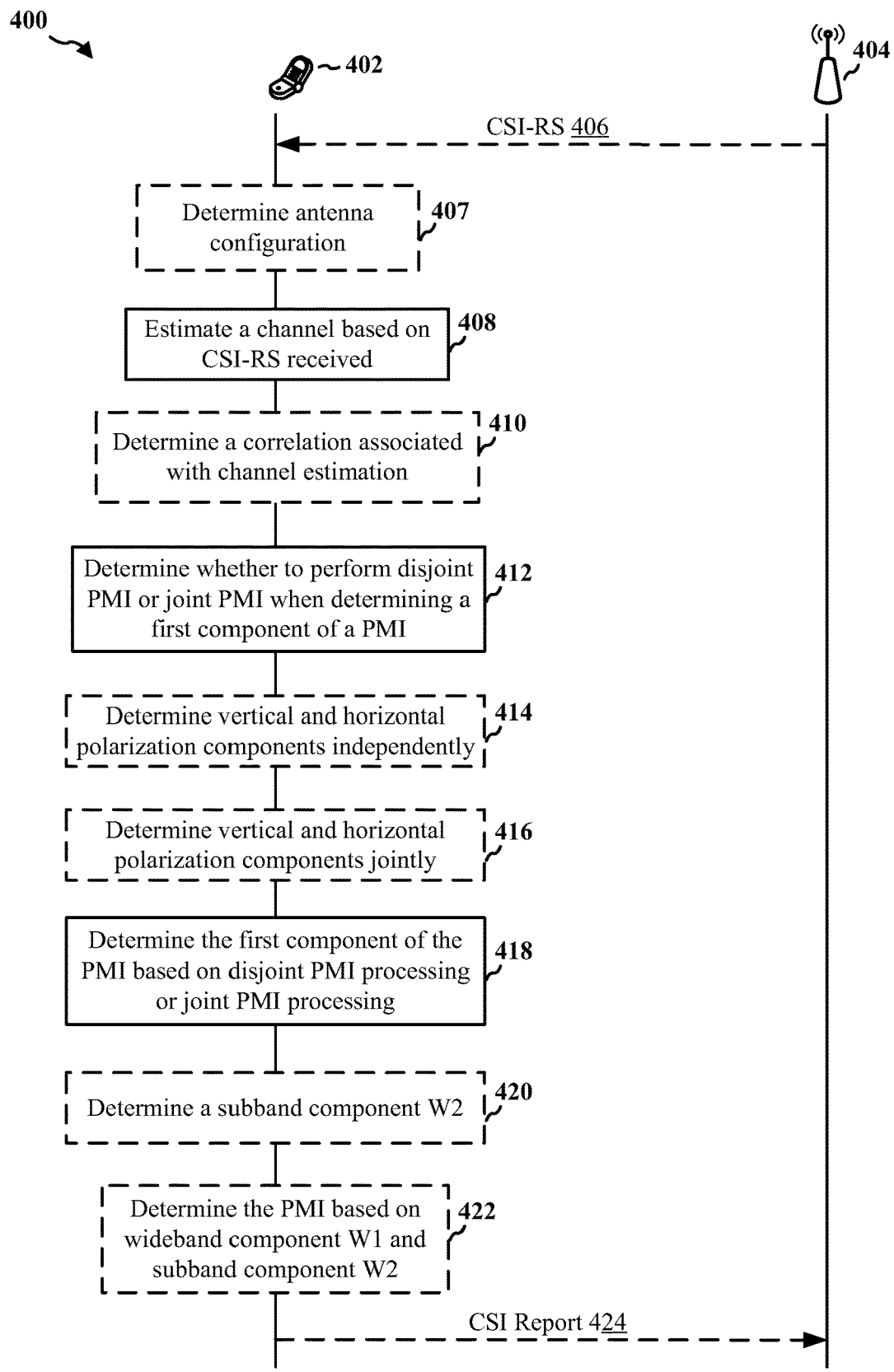
FIG. 4 is an example communication flow between a base station and a UE, in accordance with the aspects disclosed herein.

FIG. 4 illustrates an example of wireless communication 400 between a base station 402 and a UE 404, as presented herein. One or more aspects of the base station 402 may be implemented by the base station 102/180 of FIG. 1 and/or the base station 310 of FIG. 3. One or more aspects of the UE 404 may be implemented by the UE 104 of FIG. 1 and/or the UE 350 of FIG. 3.

It should be appreciated that while the wireless communication 400 includes one base station 404 in communication with one UE 402, in additional or alternative examples, the base station 404 may be in communication with any suitable quantity of UEs 402 and/or base stations 404, and/or the UE 402 may be in communication with any suitable quantity of base stations 404 and/or UEs 402. Furthermore, while the wireless communication 400 includes a channel state feedback procedure between the base station 404 and the UE 402, it should be appreciated that in other examples, the wireless communication 400 may include additional or alternative feedback procedures.

As shown in the example of FIG. 4, the UE may receive a CSI-RS 406 from the base station 404. In some examples, the UE 402 may measure various radio channel conditions and report the measurements to the base station 404 in response to the CSI-RS 406 (e.g., may perform the channel state feedback procedure). For example, after receiving the CSI-RS 406, the UE 402 may estimate, at 408, a channel based on CSI-RS received on each port of a plurality of CSI-RS ports from a base station. In some aspects, after receiving the CSI-RS 406, the UE 402, for example, at 407, may determine whether an antenna configuration, at the base station 404, comprises a one-dimensional (1D) configuration or at least a two-dimensional (2D) configuration based on the CSI-RS from the base station 404. The determination of the antenna configuration at the base station may be used to determine the PMI processing to be used. For example, in some aspects, the UE may determine to use joint PMI processing when the antenna configuration at the base station is the 1D configuration. In some aspects, the UE may determine to perform the channel estimation (e.g., 408) based on the CSI-RS when the antenna configuration at the base station is at least the 2D configuration.

In some aspects, the UE, at 410, may determine a correlation associated with the channel estimation. For example, the UE, in determining the correlation associated with the estimated channel, may be configured to determine a correlation between vertical polarization components of the CSI-RS and horizontal polarization components of the CSI-RS received at the UE on the CSI-RS ports. In some aspects, the UE, in determining the correlation associated with the estimated channel, may be configured to determine a correlation among horizontal polarization components. In some aspects, the UE, in determining the correlation associated with the estimated channel, may be configured to determine a correlation among vertical polarization components. In some aspects, the UE, in determining the correlation associated with the estimated channel, may be configured to determine a correlation between one or more receive antennas of the UE. In some aspects, correlation factors may be computed using Equation 8 (below)

$$C_{Tx_k Rx_{mn}} = E\{Re[h_{Tx_k Rx_m} \times h_{Tx_k Rx_n}^*]\} + j \cdot E\{Im[h_{Tx_k Rx_m} \times h_{Tx_k Rx_n}^*]\}$$ (Equation 8)

In Equation 8, $Tx_k$ may represent the transmit antenna k, and $Rx_m$ and $Rx_n$ may represent the receive antenna pairs [m=0, n={1, 2, . . . , n}].

The UE, at 412, may determine whether to perform disjoint PMI processing or joint PMI processing to determine a first component of the PMI. In some aspects, determining to perform either disjoint of joint PMI processing may be based on the channel estimation (e.g., 408). In some aspects, determining to perform disjoint PMI processing or joint PMI processing may be based on the long-term properties of the channel. In some aspects, determining to perform disjoint PMI processing or joint PMI processing may be based on the determined correlation between the vertical and horizontal polarization components. In some aspects, determining to perform disjoint PMI processing or joint PMI processing may be based on a comparison of the determined correlation to a threshold. For example, is such aspects, the disjoint PMI processing may be determined to be used to determine the first component of the PMI when the correlation is less than a threshold. In addition, the joint PMI processing may be determined to be used to determine the first component of the PMI when the correlation is greater than a threshold. The threshold may be a predetermined value (e.g., set in a standard) or may be a configurable value.

In some aspects, the UE, for example at 414, may determine to perform disjoint PMI processing. The UE may perform disjoint PMI processing by determining vertical polarization components and horizontal polarization components independently of each other of the CSI-RS received at the UE on the CSI-RS ports.

In some aspects, the UE, for example at 416, may determine to perform joint PMI processing. The UE may perform joint PMI processing by determining vertical polarization components and horizontal polarization components jointly together of the CSI-RS received at the UE on the CSI-RS ports. The determination of performing either joint or disjoint PMI processing may be based on any number of factors discussed above.

The UE, at 418, may determine the first component of the PMI based on the determined disjoint processing or joint PMI processing. Upon the determination of the type PMI processing to utilize, the UE may determine the first component of the PMI.

For example, the PMI may be equal to a product of a wideband component $W_1$ and a subband component $W_2$. The first component of the PMI may be represented by the wideband component $W_1$. In some aspects, the PMI may be determined based on Equation 1.

After determining the first component of the PMI, the UE, for example at 420, may determine the subband component $W_2$ based on the determined wideband component $W_1$. After determining the subband component $W_2$, the UE, for example at 422, may determine the PMI based on the determined wideband component $W_1$ and the CSI-RS signal determined subband component $W_2$.

After determining the PMI, the UE, for example at 422, may generate and transmit a CSI report 424 to the base station 404. The CSI report 424 may include the determined PMI.

Figure 5:
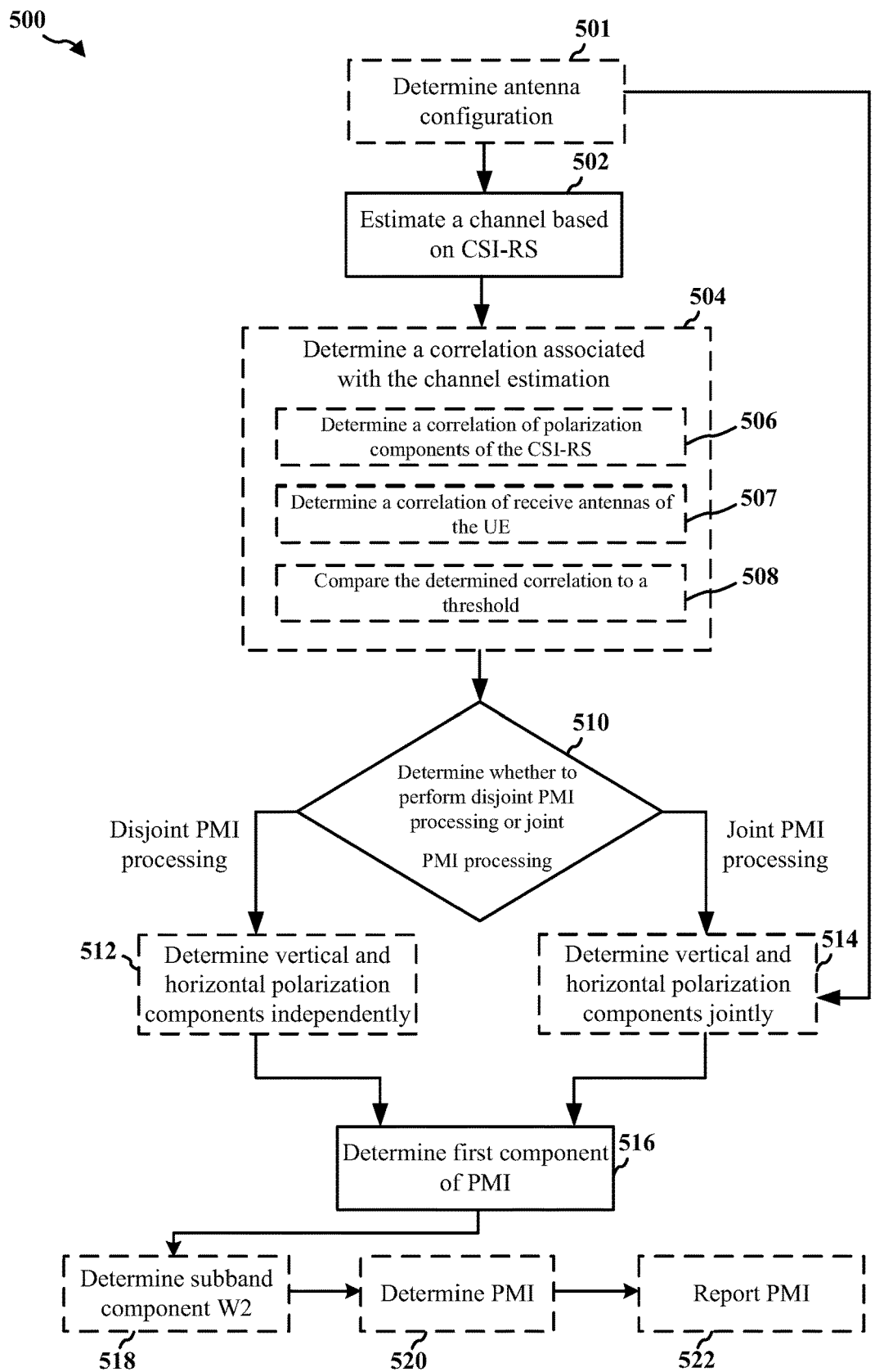
FIG. 5 is a flowchart of a method of wireless communication.

FIG. 5 is a flowchart 500 of a method of wireless communication. The method may be performed by a UE (e.g., the UE 104, 350, 402; the apparatus 602/602'; the processing system 714, which may include the memory 360 and which may be the entire UE 350 or a component of the UE 350, such as the TX processor 368, the RX processor 356, and/or the controller/processor 359). Optional aspects are illustrated with a dashed line.

The flowchart 500 of FIG. 5 is a method of wireless communication that facilitates improving performance in 2D antenna configurations via dynamically determining to select between a disjoint PMI processing or joint PMI processing in the channel state feedback process and results in significant complexity reduction.

At 501, the UE may determine whether the antenna configuration, at the base station, comprises the 1D configuration or at least the 2D configuration based on the CSI-RS from the base station, as described in connection with, for example, the determining the antenna configuration 407 of FIG. 4. For example, 501 may be performed by antenna configuration component 605 of apparatus 602. In some aspects, the UE may determine to use joint PMI processing to determine the first component of the PMI when the antenna configuration at the base station is the 1D configuration. In some examples, the UE may determine to perform a channel estimation based on the CSI-RS when the antenna configuration at the base station is at least the 2D configuration.

At 502, the UE may estimate a channel based on CSI-RS received on each port of a plurality of CSI-RS ports from a base station, as described in connection with, for example, the estimating the channel 408 of FIG. 4. For example, 502 may be performed by channel estimation component 606 of apparatus 602.

At 504, the UE may determine a correlation associated with the channel estimation, as described in connection with, for example, the determining the correlation 410 of FIG. 4. For example, 504 may be performed by correlation component 608.

In some examples, at 506, the UE, in determining the correlation associated with the estimated channel, may determine a correlation of polarization components of the CSI-RS received at the UE on the CSI-RS ports. For example, 506 may be performed by polarization correlation component 610. In some aspects, the UE may determine a correlation between vertical polarization components and horizontal polarization components in determining the correlation associated with the estimated channel. In some aspects, the UE may determine a correlation among vertical polarization components in determining the correlation associated with the estimated channel. In some aspects, the UE may determine a correlation among horizontal polarization components in determining the correlation associated with the estimated channel.

In some examples, at 507, the UE, in determining the correlation associated with the estimated channel, may determine a correlation between one or more receive antennas of the UE. For example, 507 may be performed by antenna correlation component 611.

In some examples, at 508, the UE to determine, based on the channel estimation, whether to perform disjoint PMI processing or joint PMI processing may be further based on a comparison of the determined correlation to a threshold. For example, 508 may be performed by comparison component 612. In some examples, the disjoint PMI processing may be determined to be used to determine the first component of the PMI when the correlation is less than the threshold. In some examples, the joint PMI processing may be determined to be used to determine the first component of the PMI when the correlation is greater than the threshold.

At 510, the UE may determine, based on the channel estimation, whether to perform disjoint PMI processing or joint PMI processing when determining the first component of the PMI, as described in connection with, for example, the determining whether to perform disjoint PMI or joint PMI 412 of FIG. 4. For example, 510 may be performed by PMI processing component 614. In some examples, determining whether to perform disjoint PMI processing or joint PMI processing, based on the channel estimation, may be based on long-term properties of the channel. In some examples, determining whether to perform disjoint PMI processing or joint PMI processing, based on the channel estimation, may be based on the determined correlation.

At 512, the UE, to perform disjoint PMI processing, may determine vertical polarization components and horizontal polarization components independently of each other of the CSI-RS received at the UE on the CSI-RS ports, as described in connection with, for example, the determining of vertical and horizontal polarization components 414 of FIG. 4. For example, 512 may be performed by disjoint PMI component 616.

At 514, the UE, to perform joint PMI processing, may determine vertical polarization components and horizontal polarization components jointly together of the CSI-RS received at the UE on the CSI-RS ports, as described in connection with, for example, the determining of vertical and horizontal polarization components 416 of FIG. 4. For example, 514 may be performed by joint PMI component 618.

At 516, the UE may determine the first component of the PMI based on the determined disjoint PMI processing or joint PMI processing, as described in connection with, for example, the determining the first component 418 of FIG. 4. For example, 516 may be performed by W1 component 620.

At 518, the UE may determine the subband component W2 based on a determined wideband component W1, as described in connection with, for example, the determining of subband component W2 420 of FIG. 4. For example, 518 may be performed by W2 component 622.

At 520, the UE may determine the PMI based on the determined wideband component W1 and the CSI-RS signal determined subband component W2, as described in connection with, for example, the determining the PMI 422 of FIG. 4. For example, 520 may be performed by PMI component 624. In some examples, the PMI may be equal to a product of the wideband component W1 and the subband component W2. The first component may be the wideband component W1.

At 522, the UE may report the determined PMI to the base station, as described in connection with, for example, CSI report 424 of FIG. 4. For example, 522 may be performed by reporting component 626.

Figure 6:
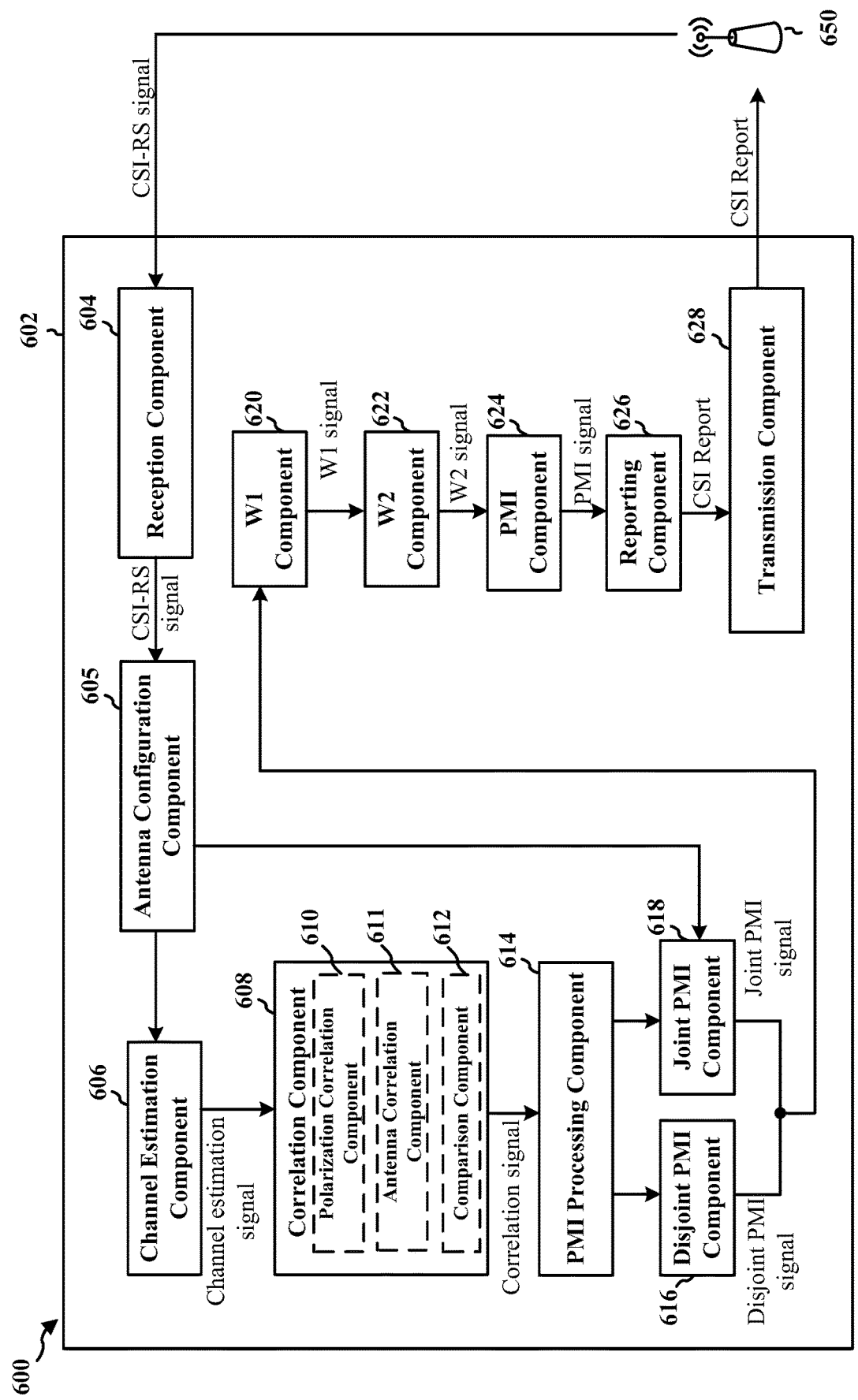
FIG. 6 is a conceptual data flow diagram illustrating the data flow between different means/components in an example apparatus.

FIG. 6 is a conceptual data flow diagram 600 illustrating the data flow between different means/components in an example apparatus 602 in communication with a base station 650. The apparatus may be a UE. The apparatus may perform the method of flowchart 500. The apparatus includes a reception component 604 that may be configured to receive various types of signals/messages and/or other information from other devices, including, for example, the base station 650. The apparatus includes an antenna configuration component 605 that may determine whether the antenna configuration, at the base station, comprises the 1D or at least the 2D configuration, e.g., as described in connection with 501. The apparatus includes a channel estimation component 606 that may estimate a channel based on CSI-RS received on each port of a plurality of CSI-RS ports from the base station, e.g., as described in connection with 502. The apparatus includes a correlation component 608 that may determine the correlation associated with the channel estimation, e.g., as described in connection with 504. The apparatus includes a polarization correlation component 610 that, in determining the correlation associated with the estimated channel, may determine a correlation of vertical polarization components and/or horizontal polarization components of the CSI-RS received at the UE on the CSI-RS ports, e.g., as described in connection with 506. The apparatus includes an antenna correlation component 611 that, in determining the correlation associated with the estimated channel, may determine a correlation between one or more receive antennas of the UE, e.g., as described in connection with 507. The apparatus includes a comparison component 612 that, in determining whether to perform disjoint PMI processing or joint PMI processing, based on the channel estimation, may be further based on a comparison of the determined correlation to a threshold, e.g., as described in connection with 508. In some examples, the disjoint PMI processing may be determined to be used to determine the first component of the PMI when the correlation is less than the threshold. In some examples, the joint PMI processing may be determined to be used to determine the first component of the PMI when the correlation is greater than the threshold. The apparatus includes a PMI processing component 614 that may determine, based on the channel estimation, whether to perform disjoint PMI processing or joint PMI processing when determining a first component of the PMI, e.g., as described in connection with 510. The apparatus includes a disjoint PMI component 616 that may perform disjoint PMI processing, e.g., as described in connection with 512. In some examples, disjoint PMI processing includes determining vertical polarization components and horizontal polarization components independently of each other of the CSI-RS received at the UE on the CSI-RS ports. The apparatus includes a joint PMI component 618 that may perform joint PMI processing, e.g., as described in connection with 514. In some examples, joint PMI processing includes determining vertical polarization components and horizontal polarization components jointly together of the CSI-RS received at the UE on the CSI-RS ports. The apparatus includes a W1 component 620 that may determine the first component of the PMI based on the determined disjoint PMI processing or joint PMI processing, e.g., as described in connection with 516. The apparatus includes a $W_2$ component 622 that may determine the subband component W2 based on a determined wideband component W1, e.g., as described in connection with 518. The apparatus includes a PMI component 624 that may determine the PMI based on the determined wideband component W1 and the CSI-RS signal determined subband component W2, e.g., as described in connection with 520. In some examples, the PMI may be equal to a product of a wideband component W1 and a subband component W2, with the first component being the wideband component W1. The apparatus includes a reporting component 626 that may report the determined PMI to the base station, e.g., as described in connection with 522. The apparatus includes a transmission component 628 that may be configured to transmit various types of signals/messages and/or other information to other devices, including, for example, the base station 750. For example, the transmission component 628 may be configured to transmit uplink communications, such as a CSI report and/or a PMI signal generated by the reporting component 626, to the base station 750.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
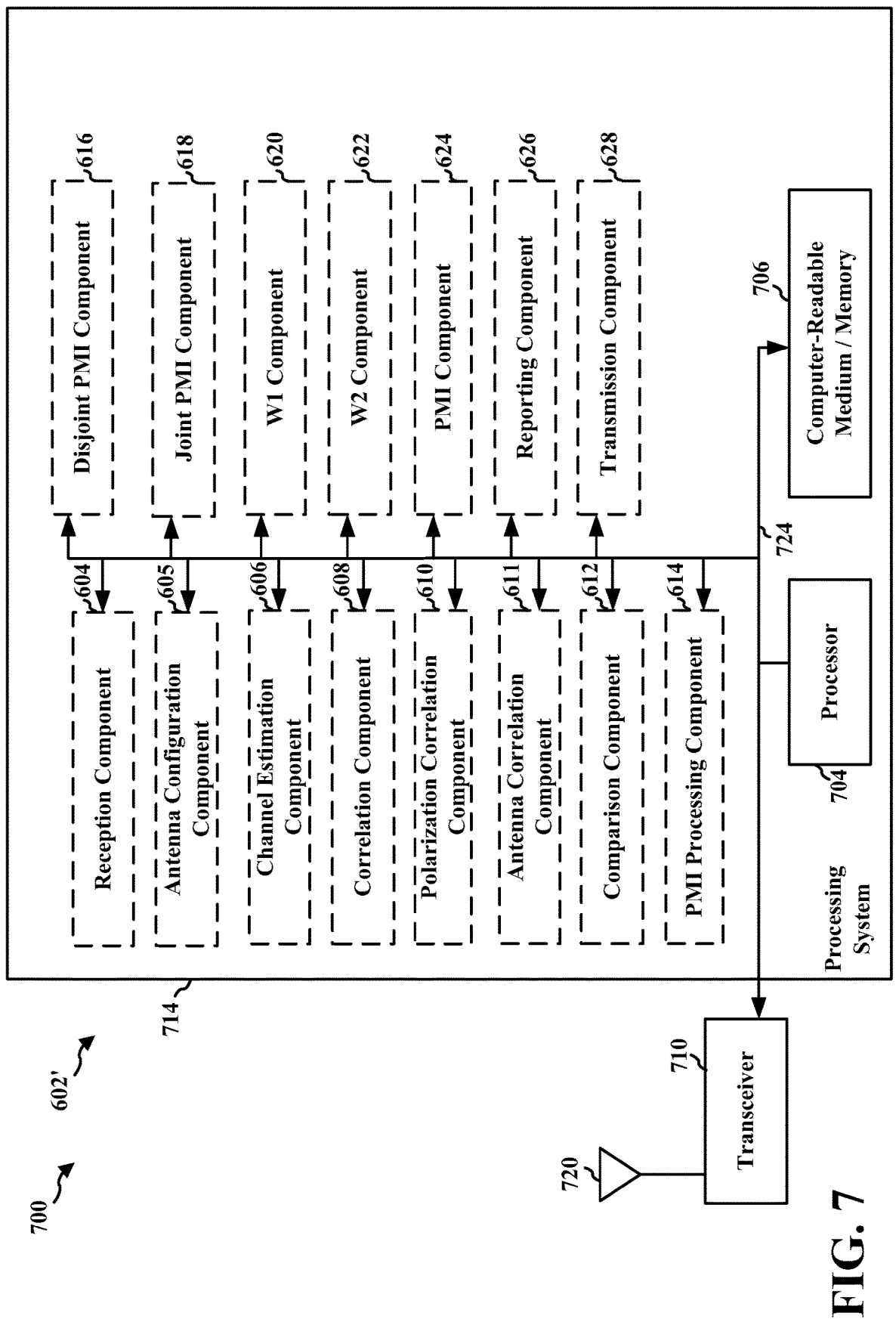
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 605, 606, 608, 610, 611, 612, 614, 616, 618, 620, 622, 624, 626, 628, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 628, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 605, 606, 608, 610, 611, 612, 614, 616, 618, 620, 622, 624, 626, 628. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for estimating a channel based on CSI-RS received on each port of a plurality of CSI-RS ports from a base station. The apparatus includes means for determining, based on the channel estimation, whether to perform disjoint PMI processing or joint PMI processing when determining a first component of a PMI. The apparatus includes means for determining the first component of the PMI based on the determined disjoint PMI processing or joint PMI processing. The apparatus further includes means for determining vertical polarization components and horizontal polarization components independently of each other of the CSI-RS received at the UE on the CSI-RS ports. The apparatus further includes means for determining vertical polarization components and horizontal polarization components jointly together of the CSI-RS received at the UE on the CSI-RS ports. The apparatus further includes means for determining a correlation associated with the channel estimation, wherein the determining, based on the channel estimation, whether to perform disjoint PMI processing or joint PMI processing is based on the determined correlation. The apparatus further includes means for determining a correlation between vertical polarization components and horizontal polarization components of the CSI-RS received at the UE on the CSI-RS ports. The apparatus further includes means for determining a correlation among horizontal polarization components. The apparatus further includes means for determining a correlation among vertical polarization components. The apparatus further includes means for determining a correlation between one or more receive antennas of the UE. The apparatus further includes means for determining the subband component $W_2$ based on the determined wideband component $W_1$. The apparatus further includes means for determining the PMI based on the determined wideband component $W_1$ and the determined subband component $W_2$. The apparatus further includes means for reporting the determined PMI to the base station. The apparatus further includes means for determining whether an antenna configuration, at a base station, comprises a 1D configuration or at least a 2D configuration based on the CSI-RS from the base station.

The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure relates to improving the manner in which a precoder may be determined in a 2D antenna configuration. The present disclosure provides a hybrid disjoint-joint PMI processing determination approach that may be utilized in 2D antenna configurations. The hybrid approach, of the present disclosure, may allow for optimal performance in determining the precoder while reducing the CSI complexity. The hybrid approach may be configured to determine when the channel may be experiencing high antenna correlation, and fall back to joint PMI processing. High channel correlation may lead to a reduction of performance for disjoint PMI processing, such that the approach may fall back to joint PMI processing and does not lead to a degradation of performance It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    estimating a channel based on channel state information reference signals (CSI-RS) received on each port of a plurality of CSI-RS ports from a base station;
    determining, based on the channel estimation, whether to perform disjoint precoding matrix indicator (PMI) processing or joint PMI processing when determining a first component of a PMI; and
    determining the first component of the PMI based on the determined disjoint PMI processing or joint PMI processing.

2. The method of claim 1, wherein disjoint PMI processing comprises:
    determining vertical polarization components and horizontal polarization components independently of each other of the CSI-RS received at the UE on the CSI-RS ports; and
    wherein joint PMI processing comprises:
    determining vertical polarization components and horizontal polarization components jointly together of the CSI-RS received at the UE on the CSI-RS ports.

3. The method of claim 1, wherein the determining, based on the channel estimation, whether to perform disjoint PMI processing or joint PMI processing is based on long-term properties of the channel.

4. The method of claim 1, further comprising:
determining a correlation associated with the channel estimation, wherein the determining, based on the channel estimation, whether to perform disjoint PMI processing or joint PMI processing is based on the determined correlation.

5. The method of claim 4, wherein the determining the correlation associated with the estimated channel comprises:
determining a correlation between vertical polarization components and horizontal polarization components of the CSI-RS received at the UE on the CSI-RS ports.

6. The method of claim 4, wherein the determining the correlation associated with the estimated channel comprises:
determining a correlation among horizontal polarization components.

7. The method of claim 4, wherein the determining the correlation associated with the estimated channel comprises:
determining a correlation among vertical polarization components.

8. The method of claim 4, wherein the determining the correlation associated with the estimated channel comprises:
determining a correlation between one or more receive antennas of the UE.

9. The method of claim 4, wherein the determining, based on the channel estimation, whether to perform disjoint PMI processing or joint PMI processing is further based on a comparison of the determined correlation to a threshold.

10. The method of claim 9, wherein the disjoint PMI processing is determined to be used to determine the first component of the PMI when the correlation is less than the threshold, and the joint PMI processing is determined to be used to determine the first component of the PMI when the correlation is greater than the threshold.

11. The method of claim 1, wherein the PMI is equal to a product of a wideband component $W_1$ and a subband component $W_2$, the first component being the wideband component $W_1$.

12. The method of claim 11, further comprising:
determining the subband component $W_2$ based on the determined wideband component $W_1$;
determining the PMI based on the determined wideband component $W_1$ and the CSI-RS signal determined subband component $W_2$; and
reporting the determined PMI to the base station.

13. The method of claim 1, further comprising:
determining whether an antenna configuration, at a base station, comprises a one-dimensional (1D) configuration or at least a two-dimensional (2D) configuration based on the CSI-RS from the base station.

14. The method of claim 13, wherein the joint PMI processing is determined to be used to determine the first component of the PMI when the antenna configuration, at the base station, is the 1D configuration.

15. The method of claim 13, wherein the UE determines to perform the channel estimation based on the CSI-RS when the antenna configuration, at the base station, is the at least the 2D configuration.

16. An apparatus for wireless communication, comprising:
means for estimating a channel based on channel state information reference signals (CSI-RS) received on each port of a plurality of CSI-RS ports from a base station;
means for determining, based on the channel estimation, whether to perform disjoint precoding matrix indicator (PMI) processing or joint PMI processing when determining a first component of a PMI; and
means for determining the first component of the PMI based on the determined disjoint PMI processing or joint PMI processing.

17. The apparatus of claim 16, wherein disjoint PMI processing comprises:
means for determining vertical polarization components and horizontal polarization components independently of each other of the CSI-RS received at the UE on the CSI-RS ports; and
wherein joint PMI processing comprises:
means for determining vertical polarization components and horizontal polarization components jointly together of the CSI-RS received at the UE on the CSI-RS ports.

18. The apparatus of claim 16, wherein the determining, based on the channel estimation, whether to perform disjoint PMI processing or joint PMI processing is based on long-term properties of the channel.

19. The apparatus of claim 16, further comprising:
means for determining a correlation associated with the channel estimation, wherein the determining, based on the channel estimation, whether to perform disjoint PMI processing or joint PMI processing is based on the determined correlation.

20. The apparatus of claim 19, wherein the means for determining the correlation associated with the estimated channel comprises:
means for determining a correlation between vertical polarization components and horizontal polarization components of the CSI-RS received at the UE on the CSI-RS ports.

21. The apparatus of claim 19, wherein the means for determining the correlation associated with the estimated channel comprises:
means for determining a correlation among horizontal polarization components.

22. The apparatus of claim 19, wherein the means for determining the correlation associated with the estimated channel comprises:
means for determining a correlation among vertical polarization components.

23. The apparatus of claim 19, wherein the means for determining the correlation associated with the estimated channel comprises:
means for determining a correlation between one or more receive antennas of the UE.

24. The apparatus of claim 19, wherein the determining, based on the channel estimation, whether to perform disjoint PMI processing or joint PMI processing is further based on a comparison of the determined correlation to a threshold.

25. The apparatus of claim 24, wherein the disjoint PMI processing is determined to be used to determine the first component of the PMI when the correlation is less than the threshold, and the joint PMI processing is determined to be used to determine the first component of the PMI when the correlation is greater than the threshold.

26. The apparatus of claim 16, wherein the PMI is equal to a product of a wideband component $W_1$ and a subband component $W_2$, the first component being the wideband component $W_1$.

27. The apparatus of claim 26, further comprising:
means for determining the subband component $W_2$ based on the determined wideband component $W_1$;

means for determining the PMI based on the determined wideband component $W_1$ and the determined subband component $W_2$; and means for reporting the determined PMI to the base station.

28. The apparatus of claim 26, further comprising:

means for determining whether an antenna configuration, at a base station, comprises a one-dimensional (1D) configuration or a two-dimensional (2D) configuration based on the CSI-RS from the base station.

29. An apparatus for wireless communication, comprising:

a memory; and at least one processor coupled to the memory and configured to:

estimate a channel based on channel state information reference signals (CSI-RS) received on each port of a plurality of CSI-RS ports from a base station;

determine, based on the channel estimation, whether to perform disjoint precoding matrix indicator (PMI) processing or joint PMI processing when determining a first component of a PMI; and determine the first component of the PMI based on the determined disjoint PMI processing or joint PMI processing.

30. A computer-readable medium storing computer executable code, the code when executed by a processor cause the processor to:

estimate a channel based on channel state information reference signals (CSI-RS) received on each port of a plurality of CSI-RS ports from a base station;

determine, based on the channel estimation, whether to perform disjoint precoding matrix indicator (PMI) processing or joint PMI processing when determining a first component of a PMI; and determine the first component of the PMI based on the determined disjoint PMI processing or joint PMI processing.

* * * * *